(No Model.)
J. H. HOAGUE.
HAND DRILL.
No. 281,068. Patented July 10, 1883.
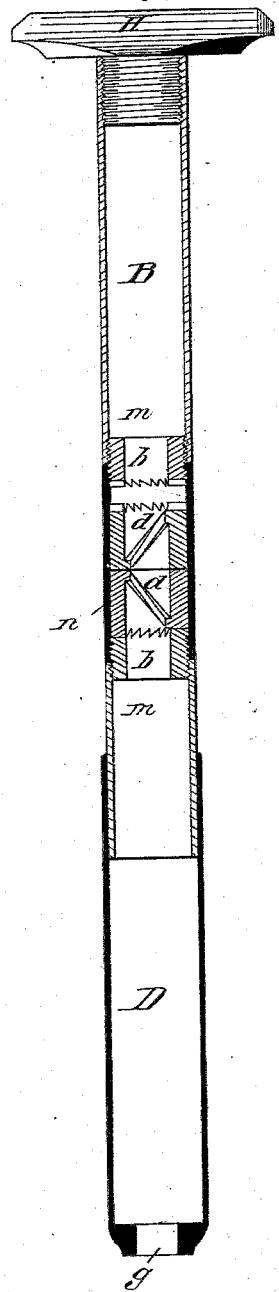
Fig I.
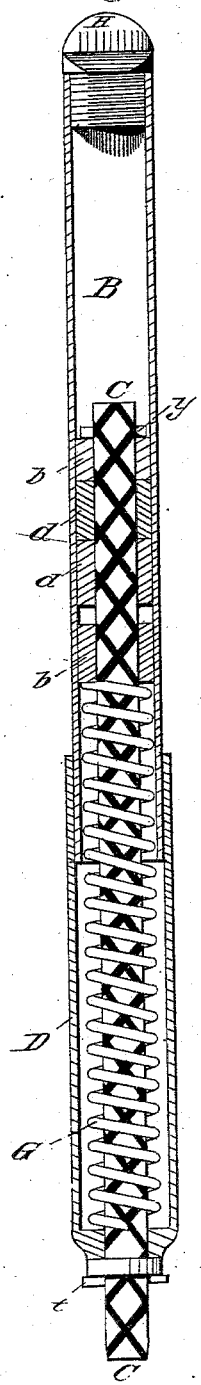
Fig II.
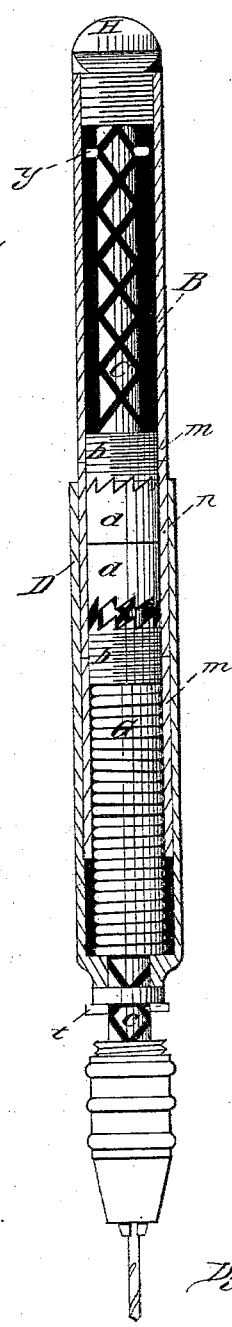
Fig III.
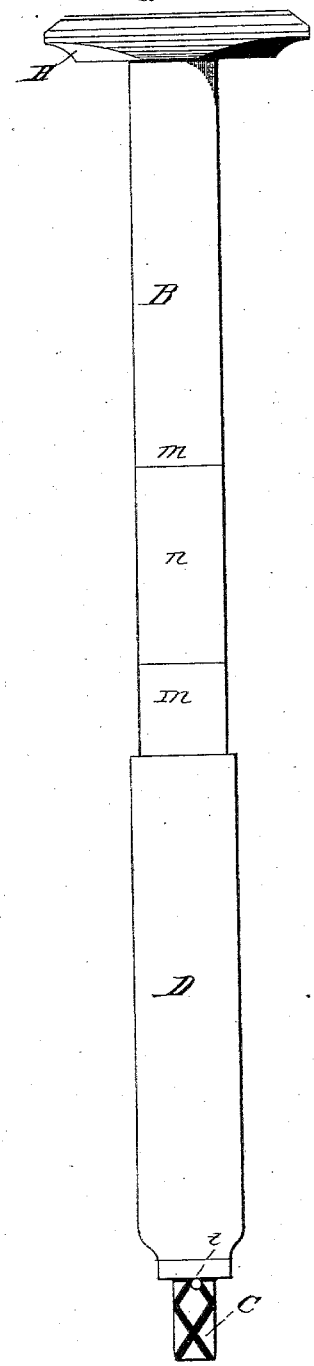
Fig IV.
Witnesses,
H. A. Chapin
H. E. Wickens
Inventor,
John H. Hoague,
by H. F. Hyde
Atty.

UNITED STATES PATENT OFFICE.

JOHN H. HOAGUE, OF CHICOPEE, MASSACHUSETTS.

HAND-DRILL.

SPECIFICATION forming part of Letters Patent No. 281,068, dated July 10, 1883.

Application filed December 6, 1882. (No model.)

*To all whom it may concern:*

Be it known that I, JOHN H. HOAGUE, a citizen of the United States, residing at Chicopee, in the county of Hampden and State of Massachusetts, have invented new and useful Improvements in Hand-Drills, of which the following is a specification.

This invention relates more particularly to improvements upon the hand-drill for which Letters Patent were granted April 19, 1881, and numbered 240,223, in which a stem having right and left intersecting grooves receives a continuous rotary motion from the reciprocation thereupon of a slide-handle provided with right and left nuts, which become alternately fixed to the slide with its change of direction; and my improvements consist in the combination and arrangement, with the stem and with the fixed ends and intermediate movable sections forming the right and left nuts, of a tubular casing in two sections, the upper one of which taking the place of a slide-handle to impart the rotation to the stem sliding within the lower, and the lower forming a handle in close proximity to the boring-tool; and my invention also consists in the peculiar construction of the upper tube for operating the loose nuts, and of the arrangement upon the stem and within the tubular casings of a coil-spring adapted to impart a movement to one tube in one direction and to enable the drill to be operated by one hand.

This invention is fully illustrated in the accompanying drawings, in which Figure I is a longitudinal section of the tubes and screw-nuts with the screw-stem and spring removed. Fig. II is the same view with the stem and spring in place. Fig. III is a longitudinal section of the tubes alone, with all of the parts in the relative position taken at the end of one stroke of the upper tube; and Fig. IV is an outside view of the device.

B is the upper tube, having one end received within the tube D. The tube B has at one end the handle H screwed into it, as shown, and secured within it, intermediate to its ends, the fixed ratchet-pieces $b\,b$, between which slide freely the nuts $d\,d$, as seen in Fig. I. The opposite internal perimeters of pieces $b\,b$ have clutch-teeth formed thereon to correspond with those upon the opposite edges of the nuts $d\,d$, while the combined length of the nuts $d\,d$ leaves a space sufficient to permit one nut to be free when the other is clutched. One nut $d$ has a right land engaging with the stem, and the other a left one, so that as the tube B is reciprocated over the stem the nuts are alternately operative to rotate the stem, the tube B being held firmly, and a continuous rotation is the result.

To enable the tube B to be securely held while being reciprocated, the handle H is formed of a T shape, as shown.

While the tube B is in effect a single tube, it is actually composed of three sections, $m\,m$ and $n$, and the pieces $b\,b$, being threaded upon their outer surfaces, form plug-couplings for the corresponding threaded ends of the tube-sections. This is shown in Figs. I and III, and by means of this form of construction the position of the parts may be accurately adjusted, easily removed for repair, and quickly reassembled.

The tube D has a central end opening, $g$, conforming in size to stem C, and is of sufficient length to furnish a handle near the chuck, where the handle is needed to steady and direct the tool. When the stem C is in place within the tubes, as seen in Fig. II, all of the parts are held together by the pins $y$ and $t$ through opposite ends of the stem, the pin $y$ coming against the top piece $b$ and the pin $t$ against the lower end of tube D.

The coil-spring G is arranged within the tubes B D to inclose the stem C and bear between the lower piece $b$ and the shoulder at the lower end of tube D, as seen in Figs. II and III, and I interpose between the lower end of tube D and pin $t$ a washer, $w$, to prevent the rotation of the pin from cutting the end of tube D. It will be seen that by this form of construction a powerful spring may be superimposed upon a solid stem, as C, and that with one hand grasping the handle H the drill may be operated to receive a continuous rotary motion.

Now, having described my invention, what I claim is—

1. In a hand-drill, the combination of the tube B, provided with an end handle having the clutch-pieces $b\,b$ and intermediate right and left nut-pieces, $d\,d$, with the inclosing lower tubular handle D, and stem C, having right and left intersecting grooves, all arranged to operate substantially as shown and described.

2. The combination, in a hand-drill, with the stem C and right and left nut-pieces $d\,d$, of the threaded sections $m\,m$ and $n$ of tube B, and the clutch-pieces $b\,b$, threaded to form plug-couplings, substantially as shown and described.

3. The combination, in a hand-drill, of the stem C, having intersecting right and left grooves or lands, the tubes B D, combined and arranged substantially as shown, and the coil-spring G, arranged without the stem and within the tubes to have its ends bear against each, whereby by one hand the drill may be operated to impart a continuous rotary motion to the tool, substantially as shown and described.

JOHN H. HOAGUE.

Witnesses:
R. F. HYDE,
H. A. CHAPIN.